United States Patent [19]

Wakazono et al.

[11] 4,192,595
[45] Mar. 11, 1980

[54] ELECTROFLASH CONTROLLING CIRCUIT INCLUDING A DELAY CIRCUIT FOR ELECTRICALLY CONTROLLED FOCAL PLANE SHUTTERS

[75] Inventors: Kenji Wakazono; Yasuo Ishiguro, both of Itabashi; Toshihisa Saito, Nakano, all of Japan

[73] Assignee: Copal Company Limited, Tokyo, Japan

[21] Appl. No.: 935,985

[22] Filed: Aug. 22, 1978

[30] Foreign Application Priority Data

Aug. 23, 1977 [JP] Japan ............................ 52-111960[U]

[51] Int. Cl.² .................................................. G03B 15/05
[52] U.S. Cl. .................................. 354/133; 354/139; 354/145
[58] Field of Search ............................. 354/27, 32–35, 354/60 F, 133, 137, 139, 145, 149, 129

[56] References Cited

U.S. PATENT DOCUMENTS

| 3,675,561 | 7/1972 | Schwartz | 354/139 |
| 3,683,769 | 8/1972 | Uchiyama et al. | 354/60 F X |
| 3,688,663 | 9/1972 | Uchiyama et al. | 354/60 F X |
| 3,690,237 | 9/1972 | Fuwa | 354/139 X |

FOREIGN PATENT DOCUMENTS 50-43738  5/1975  Japan .

Primary Examiner—L. T. Hix
Assistant Examiner—William B. Perkey
Attorney, Agent, or Firm—Cushman, Darby & Cushman

[57] ABSTRACT

An electroflash controlling circuit wherein, in order to make the fully open time of a shutter and the flashing time of a flash accurately coincide with each other, a delaying circuit operated by an electric signal for starting a shutter blade opening motion or an electric signal for starting a shutter blade closing motion is provided so that a flashing circuit may be triggered after the lapse of a delay time made by the delaying circuit.

4 Claims, 4 Drawing Figures

ELECTROFLASH CONTROLLING CIRCUIT INCLUDING A DELAY CIRCUIT FOR ELECTRICALLY CONTROLLED FOCAL PLANE SHUTTERS

BACKGROUND OF THE INVENTION (a) Field of the Invention

This invention relates to an electroflash controlling circuit for electrically controlled focal plane shutters.

(b) Description of the Prior Art

A type of electroflash controlling circuit for electric shutters wherein an electric signal for closing a shutter is utilized directly for an electroflash triggering signal has been already suggested. However, this type has such defect as is mentioned below. Now, an electrically controlled focal plane shutter provided with a front blade group and rear blade group in the case that the shutter speed is set at 1/125 second (the rear blade group will begin to run after the lapse of 7.8 m.s. after the front blade group begins to run) shall be exemplified and explained. In such case, as shown in FIG. 4, due to mechanical and magnetic operation delays, it will take a time of 5 m.s. before both front blade group and rear blade group actually begin to run after respective running starting electric signals or release signals are issued. The time required for the front blade group to reach the fully opened position from the position in which it perfectly covers the exposure aperture and the time required for the rear blade group to reach the perfectly covering position from the position in which it fully opens the exposure aperture are both about 6 m.s. Therefore, if the electric signal for starting the running of the rear blade group is utilized directly for the electroflash triggering signal, it will be issued as a result while the front blade group is running to open the exposure aperture and the flash lamp will flash before the front blade group reaches the fully opened position. Such defect will occur also in a type of focal plane shutter wherein the front blade group is mechanically started to run by the operation of a release button.

SUMMARY OF THE INVENTION

A primary object of the present invention is to provide an electroflash controlling circuit for electrically controlled focal plane shutters wherein, in order to eliminate the above described defect, a delaying circuit is operated by an electric signal for starting the running of the front blade group or rear blade group and, when the time determined by said delaying circuit has elapsed, the electroflashing circuit will be triggered to make the full opening of the shutter and the flashing of the flash coincide with each other.

This and other objects of the present invention will become more apparent during the course of the following detailed description and appended claims.

DESCRIPTION OF THE PREFERRED EMBODIMENT

Figure 1:
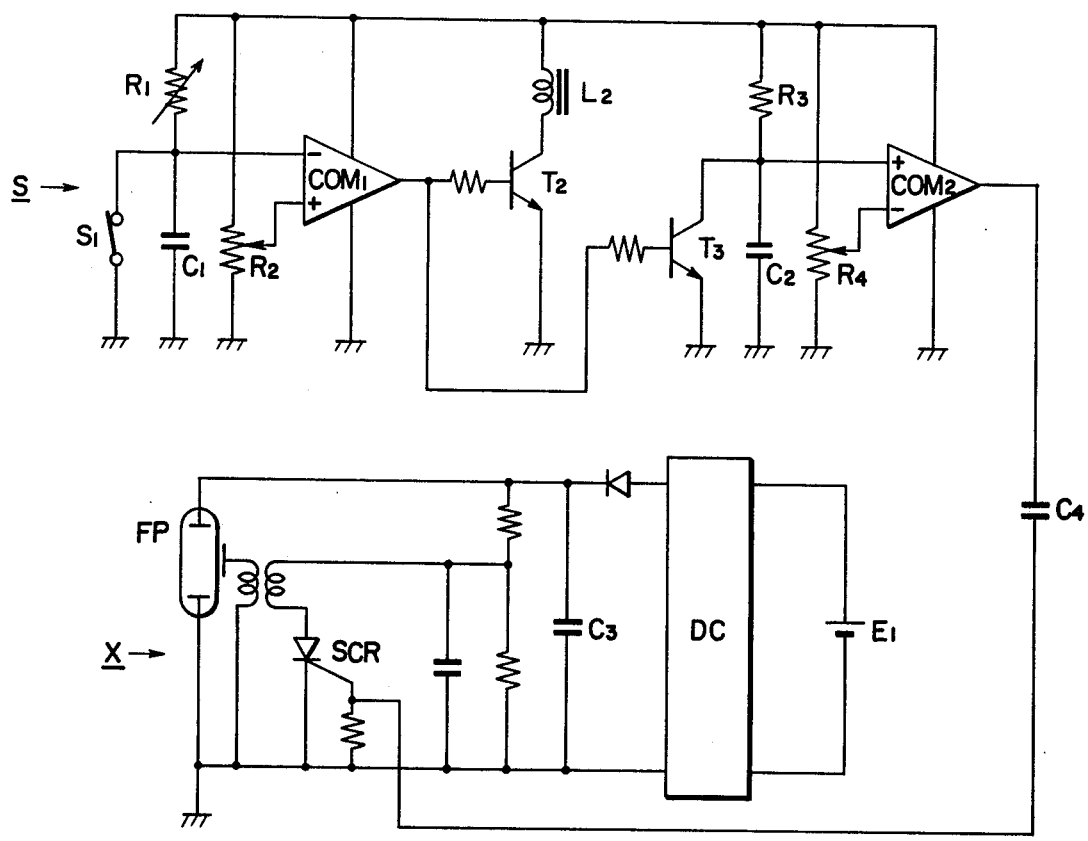
FIG. 1 is a wiring diagram showing an embodiment of the controlling circuit according to the present invention.

FIG. 1 shows a controlling circuit adapted to an electric shutter of a type wherein front blades are mechanically released by a manual operation. In the drawing, symbol S indicates an exposure controlling circuit part and X indicates an electroflashing circuit part. $R_1$ indicates a variable resistor for setting an exposure time, $C_1$ indicates a capacitor forming the first delaying circuit together with the variable resistor $R_1$ and $S_1$ indicates a normally closed switch used to start the operation of the first delaying circuit and opened in relation to the releasing operation of the front blades. Symbol $COM_1$ indicates a comparator, $R_2$ indicates a potentiometer used to give an input voltage on one side of the comparator circuit $COM_1$, $T_2$ indicates a transistor connected to the output side of the comparator circuit $COM_1$ and $L_2$ indicates an electromagnet coil used to start the rear blades or the rear blade closing motion. Symbols $R_3$ and $C_2$ indicate respectively a resistor and capacitor forming the second delaying circuit to delay the electroflashing time by a predetermined time, $T_3$ indicates a transistor used to start the operation of the second delaying circuit and connected to the output side of the comparator circuit $COM_1$ and $COM_2$ indicates a comparator circuit. Symbol $R_4$ indicates a potentiometer used to give an input voltage on one side of the comparator circuit $COM_2$, FP indicates an electroflash lamp, SCR indicates a rectifying element provided with controlling electrodes of a well known trigger circuit (which shall be described merely as SCR hereinafter), $C_3$ indicates a main capacitor, DC indicates a DC-DC converter, $E_1$ indicates a current source of an electronic flash circuit and $C_4$ indicates a coupling capacitor connected between the output side of the comparator circuit $COM_2$ and a gate of SCR.

The operation of the above mentioned circuit shall be explained in the following.

Figure 4:
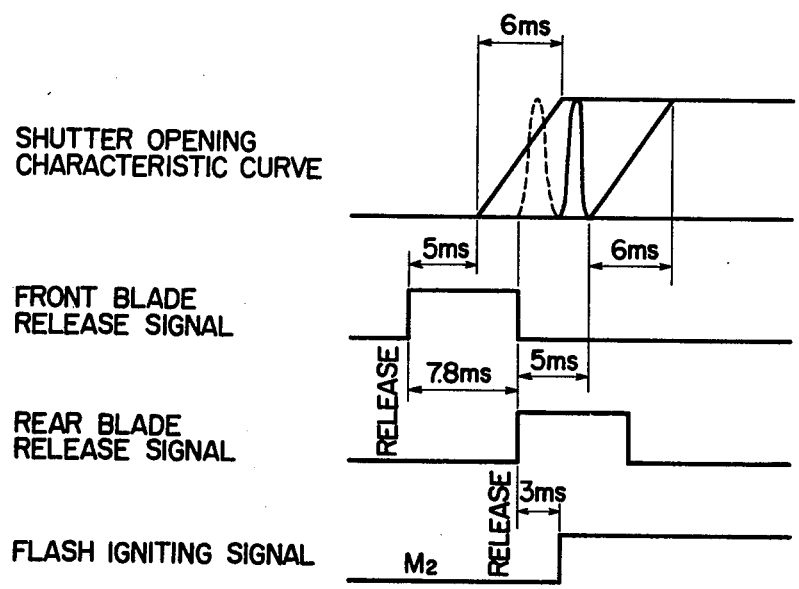
FIG. 4 is a characteristic diagram for explaining the relation between the shutter operation and the flashing.

First of all, when the release button of the camera is pushed down, a current source switch not illustrated of the exposure controlling circuit part S will be closed in the initial step and a voltage will be fed to each part of the circuit. In this state, the output of the comparator circuit $COM_1$ will be placed on the "H" level and, on the other hand, the output of the comparator circuit $COM_2$ will be placed on the "L" level. When the release button is further pushed down, the front blades will be mechanically released and the switch $S_1$ will be opened. When about 5 m.s. have elapsed after this time point, the front blades will begin to run and, after about 6 m.s., the exposure aperture will be fully opened. On the other hand, if the delay time of the first delaying circuit determined by the variable resistor $R_1$ and capacitor $C_1$, that is, the exposure time is set at 1/125 second, after 7.8 m.s. after the front blades are released, in the comparator circuit $COM_1$, the potential of the input terminal (−) will become higher than the potential of the input terminal (+) and its output will turn to the "L" level. As a result, the transistor $T_2$ will become off and the current fed to the coil $L_2$ will be interrupted. Therefore, when about 5 m.s. have elapsed after this time point, the rear blades will actually begin to run and then, after about 6 m.s., the exposure aperture will be fully closed. On the other hand, by the turning of the output of the comparator circuit $COM_1$ to the "L" level, the transistor $T_3$ will become off and the operation of the second delaying circuit consisting of the resistor $R_3$ and capacitor $C_2$ will be started. If this delay time is set at 3 m.s., after 3 m.s. after the beginning of the operation of the second delaying circuit, the output of the comparator circuit $COM_2$ will turn to the "H" level and a positive pulse will be given to the gate of SCR through the capacitor $C_4$. Therefore, the flash lamp FP will be triggered and will be flashed by the discharge of the main capacitor $C_3$. In such case, the flash continuing time of the flash lamp FP will be about 2 m.s. Therefore, as shown by the solid line in FIG. 4, the flash of the flash lamp FP will reach the maximum brightness while the front blades reach the substantially fully opened position and then the rear blades begin to run.

Figure 2:
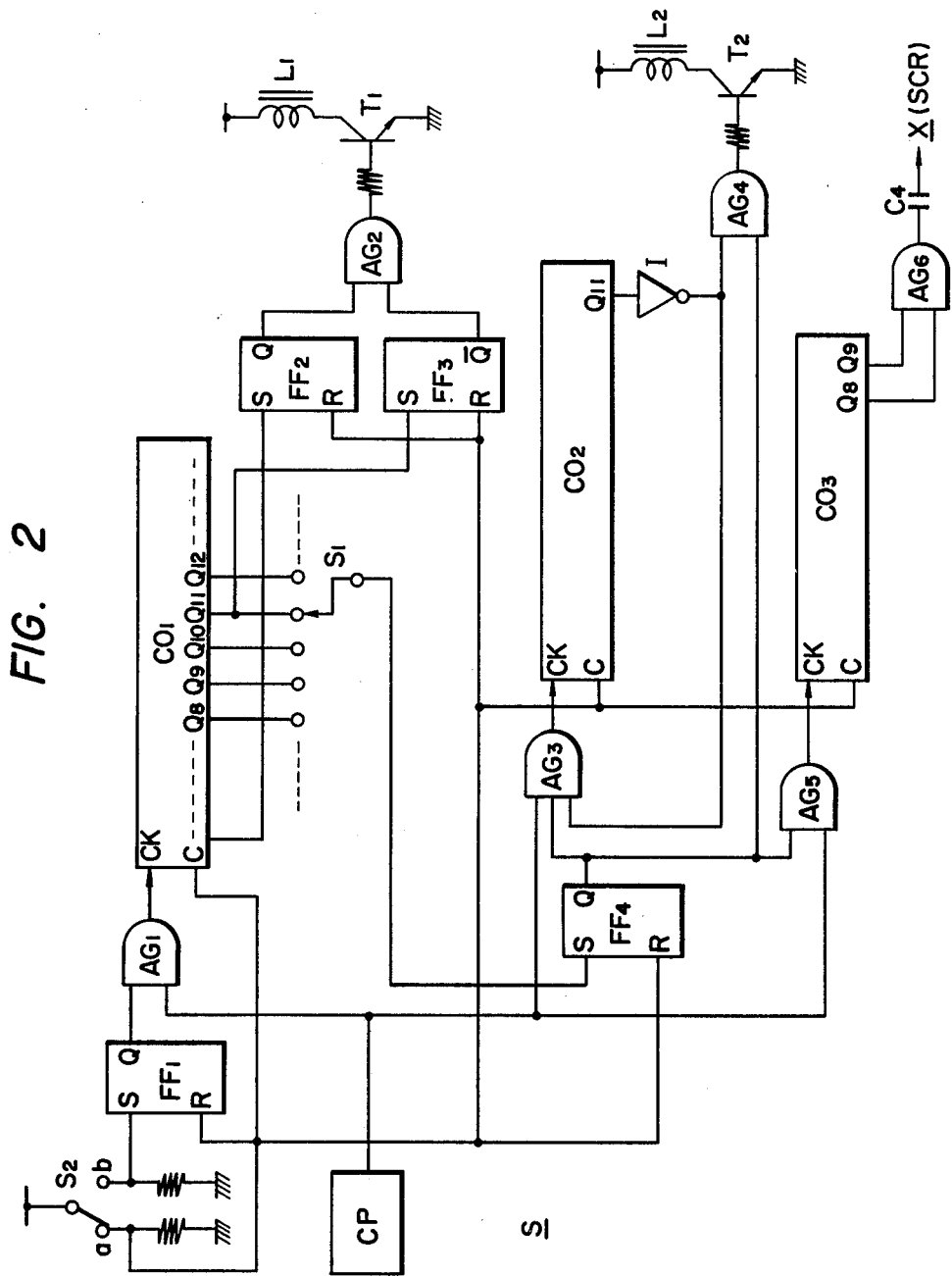
FIG. 2 is a wiring diagram showing another embodiment of the controlling circuit according to the present invention.

FIG. 2 shows a controlling circuit adapted to an electric shutter of a type wherein front blades are also electrically released. Here only exposure controlling circuit parts are shown. In the drawing, symbol $S_2$ indicates a release switch, CP indicates a clock pulse generating circuit, $CO_1$ indicates a counter for setting the exposure time, $CO_2$ indicates a counter controlling the time of passing a current to the coil $L_2$, $CO_3$ indicates a counter for delaying the flashing time of the electroflash, $T_1$ and $L_1$ indicate respectively a transistor and coil used to release the front blades, $FF_1$ to $FF_4$ indicate flip-flop circuits (which shall be described merely only by the symbols hereinafter), $AG_1$ to $AG_6$ indicate AND gates and I indicates an inverter.

The operation of the above mentioned circuit shall be explained in the following. When the release button of the camera is pushed in the illustrated state and the current source switch not illustrated is closed, a voltage will be fed to each part of the circuit and, when the switch $S_2$ is connected to the terminal a side, $FF_1$ to $FF_4$ will be reset and the counters $CO_1$ to $CO_3$ will be cleared. If the release button is further pushed in and the switch $S_2$ is switched from the terminal a to the terminal b, $FF_1$ to $FF_4$ will be released from their reset states and the counters $CO_1$ to $CO_3$ will become active on the clock input. As a result, in $FF_1$, the set input S will be set on the "H" level and the output Q will turn to the "H" level. Therefore, the AND gate $AG_1$ will open its gate and will send a clock pulse into the counter $CO_1$. The counter $CO_1$ will be triggered by the fall of the clock pulse, an output signal will appear in the output Q in the first step and, after $T_n$ seconds determined by the following formula, a signal will appear in the output $Q_n$ of the nth step.

$$T_n = T(2^{n-1} - 1)$$

where T is a clock period.

Here, first, when the output $Q_1$ of the counter $CO_1$ turns to the "H" level, $FF_2$ will be set and its output Q will turn to the "H" level. At this time, $FF_3$ will not yet be set and its output Q will be placed on the "H" level. Therefore, the AND gate $AG_2$ will open the gate and the output will turn to the "H" level, will switch the transistor $T_1$ on and will pass a current to the coil $L_1$. As a result, the front blades will begin to actually run about 5 m.s. later than this time point. As the set input S is connected to the output $Q_{11}$ of the counter $CO_1$, if the clock frequency of the clock pulse generating circuit CP is made 131 KH$_z$, $FF_3$ will be set when the output $Q_{11}$ turns to the "H" level after 7.8 m.s. from the above formula. Thereby, the AND gate $AG_2$ will close the gate and will stop the passing of the current to the coil $L_1$. On the other hand, after the lapse of 7.8 m.s., the output $Q_{11}$ of the counter $CO_1$ will turn to the "H" level and will set $FF_4$. As a result, the output Q of $FF_4$ will turn to the "H" level, therefore the output $Q_{11}$ of the counter $CO_2$ will be on the "L" level, the output of the inverter I will be on the "H" level, therefore the AND gate $AG_4$ will open the gate and its output will turn to the "H" level, will switch the transistor $T_2$ on and will pass a current to the coil $L_2$. As a result, after a delay of about 5 m.s. after the release signal is generated, the rear blades will begin to actually run. Also, when the output Q of $FF_4$ turns to the "H" level, the AND gate $AG_3$ will open its gate and will have a clock pulse sent into the counter $CO_2$. As the inverter I is connected to the output of the counter $CO_2$, after 7.8 m.s., its output will turn to the "L" level, will close the gates of the AND gates $AG_3$ and $AG_4$, will stop the feed of the clock pulse to the counter $CO_2$, and will also stop the passing of the current to the coil $L_2$. Further, when the output Q of $FF_4$ turns to the "H" level, the AND gate $AG_5$ will open its gate and will have a clock pulse sent into the counter $CO_3$. As the output of the AND gate $AG_6$ having the outputs $Q_8$ and $Q_9$ of the counter $CO_3$ as both inputs is connected to electroflashing circuit X, 3 m.s. before the time point at which the rear blades actually run, the outputs $Q_8$ and $Q_9$ will turn to the "H" level, the output of the AND gate $AG_6$ will be on the "H" level and, the same as in the preceding embodiment, the flash lamp FP will flash.

When the switch $S_2$ is returned to the terminal a with the end of the exposing operation, $FF_1$ to $FF_4$ will be reset, the counters $CO_1$ to $CO_3$ will be cleared to be ready for the next exposure.

By the way, in the above mentioned embodiment, the clock pulse generating circuit CP is used in common. However, for example, a clock pulse generating circuit for the counter $CO_3$ may be separately provided.

Figure 3:
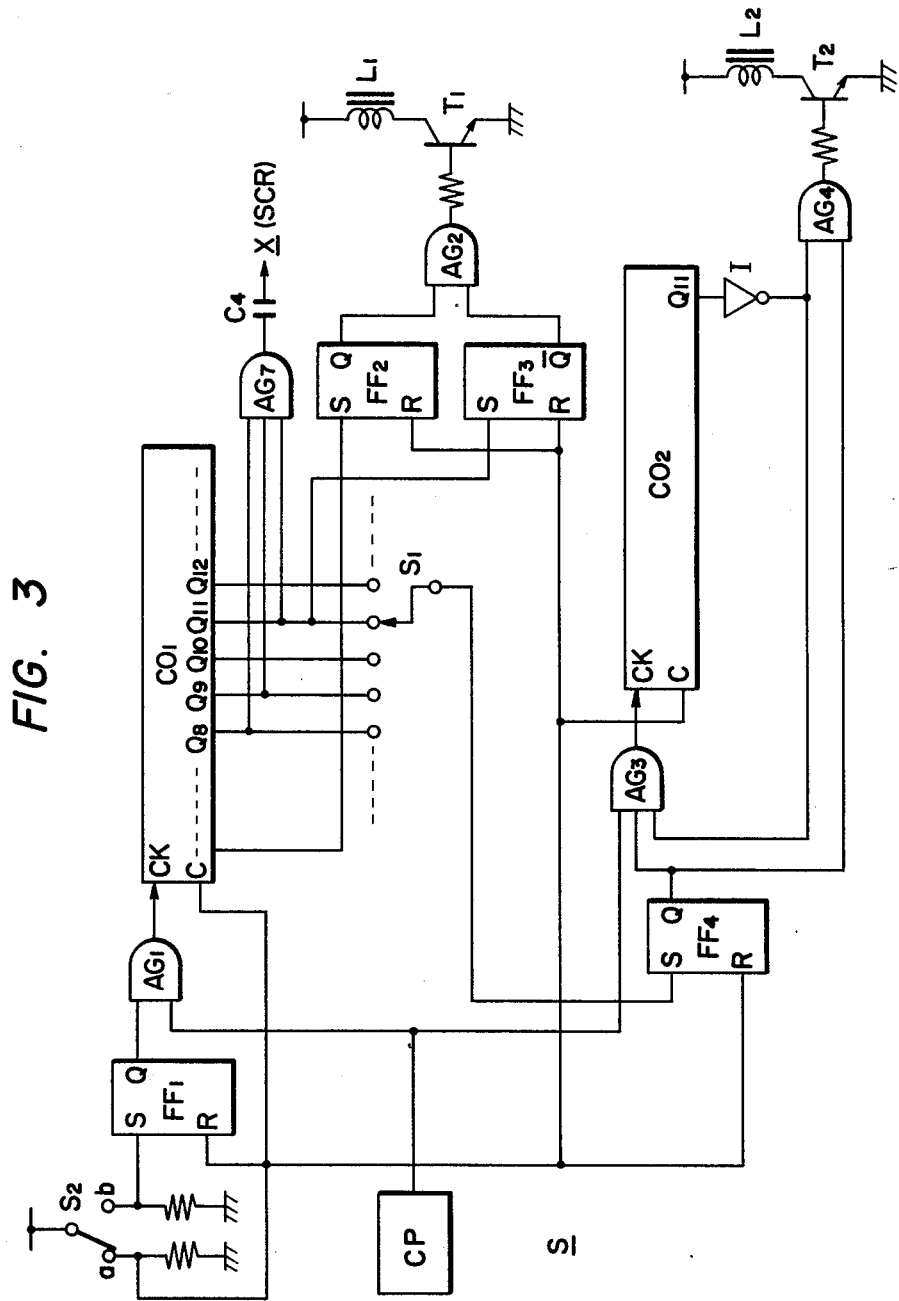
FIG. 3 is a wiring diagram showing still another embodiment of the controlling circuit according to the present invention.

Further, the counting of the counter $CO_3$ for delaying the flashing time of the flash lamp FP can be started by the release signal of the front blades. In such case, as shown in FIG. 3, an AND gate $AG_7$ having the outputs $Q_8$, $Q_9$ and $Q_{11}$ of the counter $CO_1$ as inputs may be provided to connect its output to the electroflash circuit X. According to the embodiment in FIG. 3, when 10.8 m.s. have elapsed after the release signal of the front blades is generated, the outputs $Q_8$, $Q_9$ and $Q_{11}$ of the counter $CO_1$ will all turn to the "H" level, the output of the AND gate $AG_7$ will be on the "H" level and the flash lamp FP will flash.

We claim:

1. An electroflash controlling circuit for electrically controlled focal plane shutters comprising a switch means capable of being switched by the releasing operation of a camera, a first electric delaying means for controlling the exposure time which is connected to said switch means and is made to start its delaying operation by switching said switch means, a first electromagnetic means which is connected to said first electric delaying means and has its operating state converted by the end signal of the delaying operation of said first electric delaying means and can thereby start the shutter closing motion, a second electric delaying means which is connected to said first electric delaying means and is made to start its delaying operation by the end signal of the delaying operation of said first electric delaying means and has a fixed delay time shorter than the time from the issuance of the end signal to the start of the shutter closing motion, and an electroflashing circuit which is connected to said second electric delaying means and is triggered by the end signal of the delaying operation of said second electric delaying means.

2. An electroflash controlling circuit for electronically controlled focal plane shutters according to claim 1 wherein the shutter opening motion is mechanically started by the shutter releasing operation.

3. An electroflash controlling circuit for electrically controlled focal plane shutters according to claim 1 further comprising a second electromagnetic means which is connected to said switch means and has the operating state converted in synchronization with the beginning of the delaying operation of said first electric delaying means, the shutter opening motion being started by the conversion of the operating state of said second electromagnetic means.

4. An electroflash controlling circuit for electrically controlled focal plane shutters comprising a switch means capable of being switched by the releasing operation of a camera, a first electric delaying means for controlling the exposure time which is connected to said switch means and is made to start its delaying operation by switching said switch means, a first electromagnetic means which is connected to said first electric delaying means and has the operating state converted in synchronization with the start of the delaying operation of said first electric delaying means and can thereby start the shutter opening motion, a second electromagnetic means which is connected to said first electric delaying means and has its operating state converted by the end signal of the delaying operation of said first electric delaying means and can thereby start the shutter closing motion, a second electric delaying means which is connected to said first delaying means and is made to start its delaying operation in synchronization with the start of the delaying operation of said first delaying means and has a fixed delay time shorter than the time from the issuance of the end signal to the start of the shutter closing motion, and an electroflashing circuit which is connected to said second electric delaying means and is triggered by the end signal of the delaying operation of said second electric delaying means.

* * * * *